May 2, 1944.  C. B. GLASS  2,348,002
TRAP FOR GOPHERS, RATS AND SIMILAR RODENTS
Filed Feb. 9, 1942
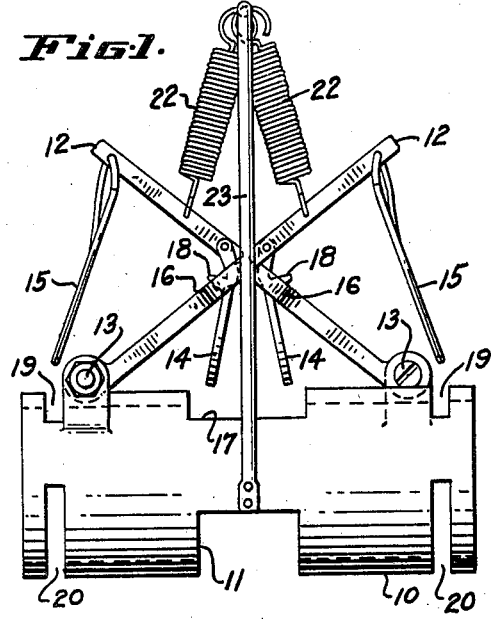
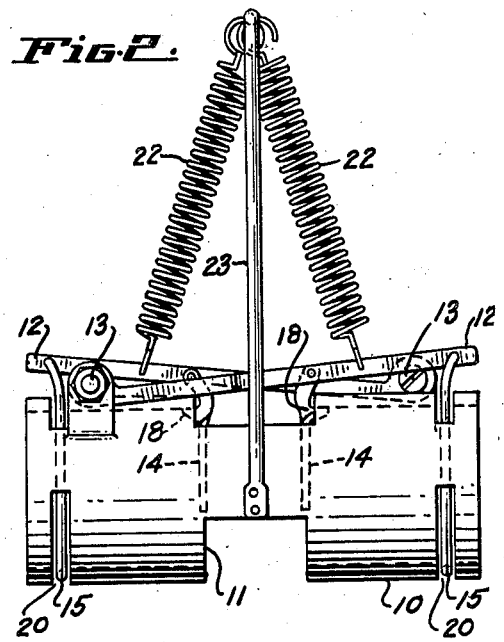
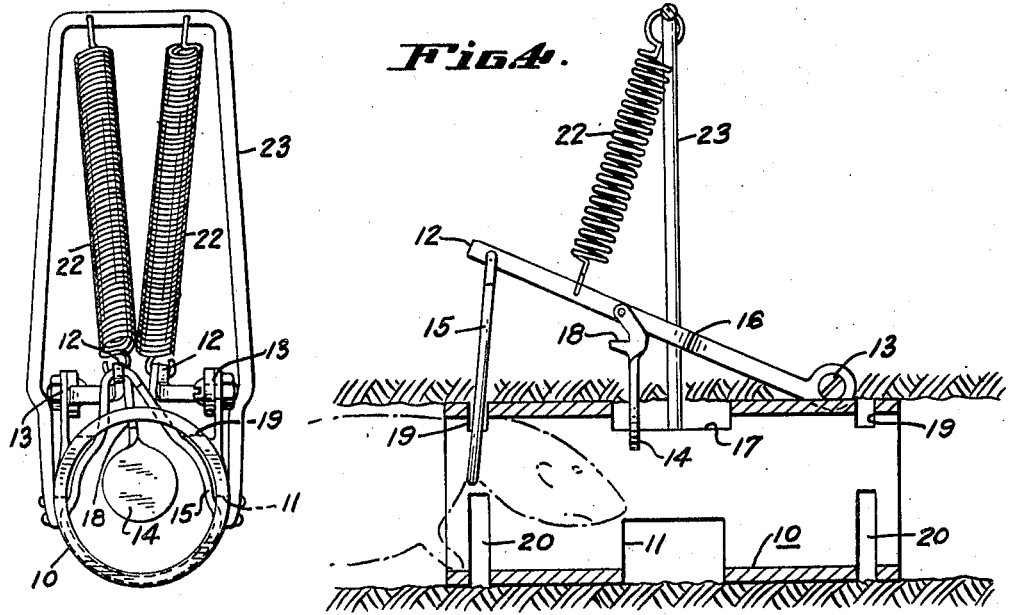
INVENTOR.
CHARLES B. GLASS
BY Naylor and Lassagne
ATTORNEYS.

Patented May 2, 1944

2,348,002

UNITED STATES PATENT OFFICE 2,348,002

TRAP FOR GOPHERS, RATS, AND SIMILAR RODENTS

Charles B. Glass, Benicia, Calif.

Application February 9, 1942, Serial No. 430,021

2 Claims. (Cl. 43—86)

This invention relates to traps and particularly to traps for gophers, rats, and similar rodents.

It is an object of this invention to provide a trap which may be conveniently set in a burrow or under ground runway and which will permit maintenance of substantially the natural condition of such places.

It is a further object of this invention to provide a trap which is comparatively simple in construction, inexpensive to manufacture, and yet quite positive in its operation. Another object of this invention is to provide a trap which will effectively garrote the animal. A further object of this invention is the provision of certain guard means to prevent accidental springing of the trap by an animal not in position to be caught thereby.

Other objects of this invention will become apparent as this specification proceeds, and the novelty of the device will be particularly pointed out in the appended claims.

In terms of general inclusion, the trap forming the subject matter of this application consists of a tubular member adapted to be fitted longitudinally within the varmint burrow and having trigger actuated means for garroting the animal within the trap. The garroting means takes the convenient form of a loop fixed at the end of a spring-urged arm which also carries a trigger in the form of a gate adapted to extend downwardly in the tubular member. By utilizing a garroting means and trigger means associated therewith at each of the two ends of the tubular member, an effective guard is provided against the accidental springing of the trap by an animal not in position to be caught thereby.

In the drawing forming a part hereof:

Figure 1 is a side elevation of the trap forming the subject matter of this application in its unset position.

Figure 2 is a side elevation of the subject matter of Figure 1 with the trap set.

Figure 3 is an end elevation of the trap in the position shown in Figure 2; and

Figure 4 is a diagrammatical view including a longitudinal section of a trap positioned in a burrow with an animal indicated therein in dotted lines.

The main body portion 10 of the trap is cylindrical in form and of a diameter corresponding substantially to the size of the average pocket gopher burrow. Preferably the body section 10 is constructed of a section of metal pipe, as it imparts a desirable weight to the whole trap such as will prevent movement thereof by a struggling rodent of the size with which the invention is concerned. The body section 10 has been constructed of a section of discarded metal pipe and found quite satisfactory. While metal pipe is specified herein, it will be understood, of course, that I do not limit myself to a material of this character and other materials may be substituted therefor without departing from the spirit of the invention.

Having due regard for the nature of the means supported thereby, it is desirable that considerable portions of the pipe 10 may be cut away as at 11 and 17 to provide a skeleton-like tubular member which, when fitted within a burrow, will leave visible the surrounding earth and thus maintain as nearly as possible the natural conditions of the animal burrow. (See Figure 4.)

An arm 12, extending longitudinally of the body member 10 and pivotally connected thereto at one end by means of a lug 13, pivotally carries a trigger or gate 14 and a noose 15 of flexible wire or or like material. Inasmuch as the arm 12 is pivotally attached to the body member 10 by means of the lug 13 disposed on a side of the body section 10, and it is desirable to center both trip 14 and noose 15 with respect to the body section 10, there is shown an angular bend 16 in the said arm 12.

As will be noted from Figure 2, when the trap is set, the trigger 14 extends through opening 17, and a catch 18 thereon engages the inner edge of the body. Additionally, the tubular body section 10 is provided with a pair of opposed top and bottom slots 19 and 20 extending therethrough to accommodate the noose 15. In the set position (Figures 2 and 3), noose 15 extends through upper slot 19, is then bent to follow the radius of the body section 10, and has its lower portion laid in the bottom slot 20. When thus arranged, the noose offers substantially no obstruction to passage of an animal into the body section 10.

The snap of the trap is provided by a spring 22, one end of which is hooked through rod 12 intermediate the trigger 14 and the noose 15 and the other end of which is secured on a yoke 23 extending upwardly from the sides of the body section 10.

While in the foregoing description, a single noose and trip means have been described, I have found in actual practice and have therefore illustrated in the accompanying drawings that the device has distinct advantages when provided with double noose and trigger means. Since the noose and trip means illustrated in the drawing are identical in all details, except position, it will not be necessary to repeat the description here. Burrowing rodents make repeated use of their passageways, and, hence, it is essential to avoid the deficiencies of a one-way trap which, while effective against animals coming toward it from one direction, may be ineffectively sprung by animals approaching from the opposite direction. In the double trap illustrated herein, the triggers 14 are spaced apart and actuate separate garroting means.

Thus, if a rodent enters the trap from the left (looking at Figure 2), it may proceed therein only so far as is necessary to actuate the left trigger 14 whereupon garroting by left noose 15 prevents further movement toward the opposite or right trigger 15. The rodent thus garroted blocks the corresponding end of the trap (see Figure 4).

In actual operation, I have often found a gopher caught in each of the two ends of the tubular body section 10 indicating that entrapment of an animal in one end of the trap does not frighten or scare off others moving in an opposite direction in the passageway.

Figure 4 of the drawing diagrammatically shows the disposition of the trap in a gopher burrow. In setting the trap, it is necessary only to prepare an opening in the burrow sufficient to accommodate the tubular portion of the trap. When the trap has been set, it is lowered into the burrow with the openings therein coinciding with the direction of the run. The earth is then packed loosely about the trap. In the double trap illustrated in the drawing, it will be appreciated that opportunity is afforded for catching a rodent proceeding in either direction in the burrow or in both directions at once. The illustration indicates the tripping of the gate means 14 by physical contact with the rodent (shown in dot and dash lines) and the drawing up of the noose 15 from the slot 20 and through the slot 19 to garrote the animal against the upper wall of the body section 10 at which point it is firmly held against possible withdrawal by the tension of spring 22.

It has been my observation that the trap may be tarred to advantage as this lessens the likelihood of corrosion of the metal and at the same time tends to mask human scents in handling the device.

While but one form of the invention has been illustrated herein, it will be appreciated that changes and rearrangement may be made in the device without departing from the spirit of the invention, and, hence, protection is desired in accordance with the full scope of the appended claims.

The invention claimed is:

1. An animal trap comprising a tubular body section having a passageway therethrough, an upwardly extending yoke disposed intermediate the ends of the tubular body section, a pair of arms pivotally attached to opposite ends of the tubular body section, spring means carried by the yoke and operatively connected to the respective arms adjacent their free ends to normally urge said free ends of the arms upwardly from the body section, an aperture through the wall of the body section beneath said yoke, a trigger pivotally connected to each of the arms having a catch engageable with the inner edge of the body section as defined by the aperture therethrough and having a dependent portion extending into and partially blocking said passageway, a flexible noose carried by the free end of each of said arms, and upper and lower opposed slots in the body section adjacent each of its ends to receive the said nooses.

2. An animal trap comprising a tubular body section having a passageway therethrough, an upwardly extending yoke disposed intermediate the ends of and straddling the tubular body section, a pair of arms pivotally attached to opposite ends of the tubular body section and extending through said yoke, spring means carried by the yoke and operatively connected to the respective arms adjacent their free ends to normally urge said free ends of the arms upwardly from the body section, an aperture through the wall of the body section beneath said yoke, a trigger pivotally connected to each of the arms having a catch engageable with the inner edge of the body section as defined by the aperture therethrough and having a dependent portion extending into and partially blocking said passageway, a flexible noose carried by the free end of each of said arms, and upper and lower opposed slots in the body section adjacent each of its ends to receive the said nooses.

CHARLES B. GLASS.